United States Patent
Saitoh

(10) Patent No.: US 9,412,513 B2
(45) Date of Patent: Aug. 9, 2016

(54) WIRELESS POWER TRANSMISSION SYSTEM

(71) Applicant: TDK Corporation, Tokyo (JP)

(72) Inventor: Yoshihiro Saitoh, Tokyo (JP)

(73) Assignee: TDK CORPORATION, Tokyo (JP)

( * ) Notice: Subject to any disclaimer, the term of this patent is extended or adjusted under 35 U.S.C. 154(b) by 462 days.

(21) Appl. No.: 13/853,831

(22) Filed: Mar. 29, 2013

(65) Prior Publication Data

US 2013/0257173 A1     Oct. 3, 2013

Related U.S. Application Data

(60) Provisional application No. 61/618,324, filed on Mar. 30, 2012.

(51) Int. Cl.
*H01F 38/14* (2006.01)
*H02J 5/00* (2016.01)

(52) U.S. Cl.
CPC ............... *H01F 38/14* (2013.01); *H02J 5/005* (2013.01)

(58) Field of Classification Search
CPC .......... H02J 17/00; H02J 5/005; H02J 7/025; H02J 3/01; H01F 38/14; B60L 11/182; B60L 11/1829; B60L 11/1831; Y02T 90/122; H04B 5/0037
USPC ............................................ 307/104
See application file for complete search history.

(56) References Cited

U.S. PATENT DOCUMENTS

| | | | |
|---|---|---|---|
| 5,952,734 A * | 9/1999 | Gelbien | G01R 33/389 307/104 |
| 6,008,622 A | 12/1999 | Nakawatase | |
| 6,317,338 B1 | 11/2001 | Boys | |
| 7,741,734 B2 | 6/2010 | Joannopoulos et al. | |
| 7,804,272 B2 | 9/2010 | Morita et al. | |
| 8,378,525 B2 | 2/2013 | Yoshikawa | |
| 2001/0012208 A1 | 8/2001 | Boys | |
| 2007/0222542 A1 | 9/2007 | Joannopoulos et al. | |
| 2008/0129246 A1 | 6/2008 | Morita et al. | |
| 2009/0058189 A1 | 3/2009 | Cook et al. | |
| 2009/0072627 A1 * | 3/2009 | Cook | H01Q 7/10 307/104 |
| 2009/0079268 A1 | 3/2009 | Cook et al. | |
| 2009/0085408 A1 * | 4/2009 | Bruhn | H01F 38/14 307/104 |
| 2009/0224608 A1 | 9/2009 | Cook et al. | |
| 2010/0127660 A1 | 5/2010 | Cook et al. | |

(Continued)

FOREIGN PATENT DOCUMENTS

| | | |
|---|---|---|
| JP | 7-046164 A | 2/1995 |
| JP | 11-103531 A | 4/1999 |

(Continued)

*Primary Examiner* — Kenneth B Wells
*Assistant Examiner* — James P Evans
(74) *Attorney, Agent, or Firm* — McDermott Will Emery LLP

(57) ABSTRACT

To improve power transmission efficiency in wireless power feeding by using a magnetic body. A wireless power transmission system 100 feeds power by wireless from a feeding coil L2 to a receiving coil L3 based on a magnetic-field resonance phenomenon between the feeding coil L2 and receiving coil L3. A transmission control circuit 200 supplies AC power to the feeding coil L2 at a drive frequency so as to make the feeding coil L2 feed the AC power to the receiving coil L3. A magnetic body F is disposed between the feeding coil L2 and receiving coil L3. The magnetic body F is disposed in a space between coil surfaces of the feeding coil L2 and receiving coil L3.

11 Claims, 22 Drawing Sheets

(56) References Cited

U.S. PATENT DOCUMENTS

| | | | |
|---|---|---|---|
| 2010/0244582 A1 | 9/2010 | Yoshikawa | |
| 2011/0127848 A1* | 6/2011 | Ryu | H02J 5/005 307/104 |
| 2011/0278941 A1* | 11/2011 | Krishna | C01G 23/002 307/104 |
| 2011/0304220 A1* | 12/2011 | Whitehead | H01F 21/08 307/104 |
| 2012/0039378 A1* | 2/2012 | Nakayama | 375/226 |
| 2012/0161533 A1* | 6/2012 | Urano | 307/104 |
| 2012/0212074 A1* | 8/2012 | Uchida | 307/104 |
| 2012/0223586 A1* | 9/2012 | Gotani | 307/104 |
| 2013/0093390 A1* | 4/2013 | Partovi | H02J 7/025 320/108 |

FOREIGN PATENT DOCUMENTS

| | | |
|---|---|---|
| JP | 2002-508916 A | 3/2002 |
| JP | 2006-314181 A | 11/2006 |
| JP | 2008-120239 A | 5/2008 |
| JP | 2010-119187 A | 5/2010 |
| JP | 2010-239848 A | 10/2010 |
| JP | 2010-283263 A | 12/2010 |
| JP | 2010-284059 A | 12/2010 |

* cited by examiner

| Rm [mm] | Rm/RoL | $\frac{\pi Rm^2}{\pi RoL^2}$ | DS[mm] | | | | | | | |
|---|---|---|---|---|---|---|---|---|---|---|
| | | | −17.5 | −15 | −10 | −5 | 0 | +5 | +10 | +15 | +17.5 |
| | | | −0.438 | −0.375 | −0.25 | −0.125 | 0 | 0.125 | 0.25 | 0.375 | 0.438 |
| | | | DS/DL | | | | | | | | |
| 5 | 0.167 | 0.028 | 88.5% | 89.4% | 89.5% | 89.9% | 89.1% | 89.9% | 89.5% | 89.4% | 88.5% |
| 10 | 0.333 | 0.111 | 88.2% | 88.4% | 88.5% | 90.1% | 89.6% | 90.1% | 88.5% | 88.4% | 88.2% |
| 20 | 0.667 | 0.444 | 83.6% | 86.5% | 87.2% | 89.3% | 89.7% | 89.3% | 87.2% | 86.5% | 83.6% |
| 25 | 0.833 | 0.694 | 80.8% | 84.3% | 86.9% | 88.5% | 88.8% | 88.5% | 86.9% | 84.3% | 80.8% |
| 27 | 0.900 | 0.810 | 79.1% | 81.6% | 86.1% | 87.6% | 88.1% | 87.6% | 86.1% | 81.6% | 79.1% |
| 30 | 1.000 | 1.000 | 69.9% | 75.5% | 84.1% | 86.2% | 87.2% | 86.2% | 84.1% | 75.5% | 69.9% |
| 40 | 1.333 | 1.778 | 64.7% | 70.9% | 79.6% | 81.6% | 80.8% | 81.6% | 79.6% | 70.9% | 64.7% |
| 50 | 1.667 | 2.778 | 63.4% | 67.4% | 69.5% | 70.1% | 70.8% | 70.1% | 69.5% | 67.4% | 63.4% |

FIG.6

| Lm/DL=0.250 Lm=10mm | | | DS[mm] | | | | | | |
|---|---|---|---|---|---|---|---|---|---|
| | | | ±17.5 | ±15 | ±10 | ±5 | 0 | ±5 | ±10 | ±15 | ±17.5 |
| Rm [mm] | Rm/RoL | $\pi Rm^2 / \pi RoL^2$ | -0.438 | -0.375 | -0.25 | -0.125 | DS/DL 0 | 0.125 | 0.25 | 0.375 | 0.438 |
| 5 | 0.167 | 0.028 | 88.4% | 88.4% | 88.9% | 89.2% | 89.6% | 89.2% | 88.9% | 88.4% | 88.4% |
| 10 | 0.333 | 0.111 | 85.1% | 87.2% | 88.4% | 89.7% | 90.0% | 89.7% | 88.4% | 87.2% | 85.1% |
| 20 | 0.667 | 0.444 | | 83.1% | 86.3% | 89.9% | 90.6% | 89.9% | 86.3% | 83.1% | |
| 25 | 0.833 | 0.694 | | 79.9% | 83.3% | 90.0% | 89.9% | 90.0% | 83.3% | 79.9% | |
| 27 | 0.900 | 0.810 | | 77.8% | 81.4% | 86.4% | 88.6% | 86.4% | 81.4% | 77.8% | |
| 30 | 1.000 | 1.000 | | 72.0% | 77.5% | 85.5% | 87.8% | 85.5% | 77.5% | 72.0% | |
| 40 | 1.333 | 1.778 | | 62.9% | 69.7% | 76.9% | 79.2% | 76.9% | 69.7% | 62.9% | |
| 50 | 1.667 | 2.778 | | 54.1% | 62.2% | 66.8% | 69.5% | 66.8% | 62.2% | 54.1% | |

FIG.7

| Lm/DL=0.500 Lm=20mm | | | DS[mm] | | | | | | | | |
|---|---|---|---|---|---|---|---|---|---|---|---|
| | | | ±17.5 | ±15 | ±10 | ±5 | 0 | ±5 | ±10 | ±15 | ±17.5 |
| RL [mm] | Rm/RoL | $\pi Rm^2 / \pi RoL^2$ | -0.438 | -0.375 | -0.25 | -0.125 | 0 | 0.125 | 0.25 | 0.375 | 0.438 |
| | | | | | | | DS/DL | | | | |
| 5 | 0.167 | 0.028 | | | 89.9% | 91.3% | 91.2% | 91.3% | 89.9% | | |
| 10 | 0.333 | 0.111 | | | 91.7% | 92.8% | 92.3% | 92.8% | 91.7% | | |
| 20 | 0.667 | 0.444 | | | 91.6% | 92.5% | 92.4% | 92.5% | 91.6% | | |
| 25 | 0.833 | 0.694 | | | 91.5% | 91.7% | 91.6% | 91.7% | 91.5% | | |
| 27 | 0.900 | 0.810 | | | 88.8% | 89.4% | 89.8% | 89.4% | 88.8% | | |
| 30 | 1.000 | 1.000 | | | *81.6%* | *85.2%* | *87.0%* | *85.2%* | *81.6%* | | |
| 40 | 1.333 | 1.778 | | | *68.4%* | *70.6%* | *71.6%* | *70.6%* | *68.4%* | | |
| 50 | 1.667 | 2.778 | | | *47.1%* | *49.7%* | *53.0%* | *49.7%* | *47.1%* | | |

FIG.8

| Lm/DL=0.750 Lm=30mm | | DS[mm] | | | | | | | | |
|---|---|---|---|---|---|---|---|---|---|---|
| | | ±17.5 | ±15 | ±10 | ±5 | 0 | ±5 | ±10 | ±15 | ±17.5 |
| RL [mm] | Rm/RoL | $\frac{\pi Rm^2}{\pi RoL^2}$ | -0.438 | -0.375 | -0.25 | -0.125 | DS/DL 0 | 0.125 | 0.25 | 0.375 | 0.438 |
| 5 | 0.167 | 0.028 | | | | 92.2% | 92.7% | 92.2% | | | |
| 10 | 0.333 | 0.111 | | | | 93.8% | 94.4% | 93.8% | | | |
| 20 | 0.667 | 0.444 | | | | 94.3% | 94.0% | 94.3% | | | |
| 25 | 0.833 | 0.694 | | | | 91.7% | 91.5% | 91.7% | | | |
| 27 | 0.900 | 0.810 | | | | *86.5%* | 88.0% | *86.5%* | | | |
| 30 | 1.000 | 1.000 | | | | *83.4%* | *85.1%* | *83.4%* | | | |
| 40 | 1.333 | 1.778 | | | | *58.3%* | *60.6%* | *58.3%* | | | |
| 50 | 1.667 | 2.778 | | | | *30.2%* | *36.2%* | *30.2%* | | | |

FIG.9

| Lm/DL=1.000 Lm=30mm | | DS[mm] | | | | | | | |
|---|---|---|---|---|---|---|---|---|---|
| | | ±17.5 | ±15 | ±10 | ±5 | 0 | ±5 | ±10 | ±15 | ±17.5 |
| RL [mm] | Rm/RoL | $\frac{\pi Rm^2}{\pi RoL^2}$ | -0.438 | -0.375 | -0.25 | -0.125 | DS/DL 0 | 0.125 | 0.25 | 0.375 | 0.438 |
| 5 | 0.167 | 0.028 | | | | | 94.0% | | | | |
| 10 | 0.333 | 0.111 | | | | | 95.8% | | | | |
| 20 | 0.667 | 0.444 | | | | | 95.7% | | | | |
| 25 | 0.833 | 0.694 | | | | | 92.5% | | | | |
| 27 | 0.900 | 0.810 | | | | | 88.0% | | | | |
| 30 | 1.000 | 1.000 | | | | | *75.9%* | | | | |
| 40 | 1.333 | 1.778 | | | | | *52.8%* | | | | |
| 50 | 1.667 | 2.778 | | | | | *26.9%* | | | | |

FIG.10

WIRELESS POWER TRANSMISSION SYSTEM

BACKGROUND OF THE INVENTION

1. Field of the Invention

The present invention relates to wireless power feeding and, more particularly, to improvement of transmission efficiency thereof.

2. Description of Related Art

When a built-in battery of a consumer device such as a notebook computer or a mobile phone needs to be charged, a charging terminal electrode provided in a consumer device body is connected to a power cord (power cable). Similarly, in a vehicle such as a PHEV (Plug-in Hybrid Electric Vehicle) or an EV (Electric Vehicle), a charging terminal electrode provided in a vehicle body is connected to a power cord (power cable) for charge of a built-in battery.

Meanwhile, a wireless power feeding technique feeding power without a power cord (in a non-contact manner) is now attracting attention. The current wireless power feeding technique includes a type utilizing electromagnetic induction (electromagnetic induction type) and a type utilizing resonance phenomenon of magnetic field (magnetic field resonance type). Both of the above types utilize an inductive coupling (magnetic field coupling) between coils.

The electromagnetic induction type has already been put into practical use and is employed in power transmission performed under the condition that a distance between a feeding coil and a receiving coil is comparatively small.

The magnetic field resonance type is a comparatively new technique and is applicable to a case where the distance between the feeding coil and receiving coil is larger than that in the case of the electromagnetic induction type (see Patent Document 1: U.S. Patent Application Publication No. 2007-0222542). In Patent Document 1, four coils are used. The four coils are referred to as "exciting coil", "feeding coil", "receiving coil", and "loading coil" in the order starting from the feeding side. The exciting coil and feeding coil closely face each other for electromagnetic coupling. Similarly, the receiving coil and loading coil closely face each other for electromagnetic coupling. The magnetic field resonance type utilizes a magnetic field resonance phenomenon between a feeding-side resonance circuit including a feeding coil and a receiving-side resonance circuit including a receiving coil.

In Jpn. Pat. Appln. Laid-Open Publication No. 2010-239848 (Patent Document 2), in a power transmission device of a magnetic field resonance type, a magnetic body is disposed outside a coil surface of a magnetic field resonance coil to attempt enhancement of power transmission efficiency.

In Jpn. Pat. Appln. Laid-Open Publication No. 2010-284059 (Patent Document 3), in a power transmission device of an electromagnetic induction type, efficiency of power transmission from the feeding coil to receiving coil is attempted to be enhanced by means of a magnetic body penetrating through a feeding coil and a receiving coil from an outside of a coil surface of the feeding coil.

Although some attempts to enhance power transmission efficiency have been made by combining the feeding and receiving coils with the magnetic body as in Patent Documents 2 and 3, a method of optimizing or controlling the power transmission efficiency based on a change in a position or a size of the magnetic body is presently off the table.

SUMMARY

A wireless power transmission system according to the present invention is a system for feeding power by wireless from a feeding coil to a receiving coil. The wireless power transmission system includes the feeding coil, a transmission control circuit that supplies AC power to the feeding coil at a drive frequency so as to make the feeding coil feed the AC power to the receiving coil, the receiving coil, a loading circuit that receives power from the receiving coil, and a magnetic body disposed between the feeding coil and receiving coil. The magnetic body is disposed in a space between coil surfaces of the feeding coil and receiving coil.

The wireless power transmission system may further include a phase detection circuit that detects a phase difference between a voltage phase and a current phase of the AC power. The transmission control circuit may adjust the drive frequency so as to reduce the phase difference to make the drive frequency track a resonance frequency. The wireless power transmission system may further include a signal transmission circuit that transmits an output signal representing a magnitude of output voltage to be applied to a part of the loading circuit and a signal receiving circuit that receives the output signal at the power feeding side. The transmission control circuit may perform ex-post adjustment of the detected value of both or one of the voltage and current phases according to the output signal.

The magnetic body may be formed so as to be movable on a coil axis connecting the feeding coil and receiving coil. It is preferable that a first ratio between a magnetic body area which is an area of a surface of the magnetic body that is opposed to the feeding coil and a coil area which is an area of the coil surface of the feeding coil or receiving coil is equal to or less than 0.81. The first ratio is more preferably equal to or less than 0.444 and still more preferably equal to or less than 0.028.

It is preferable that the first ratio is equal to or less than 0.111 when a second ratio between a magnetic body length which is a length of the magnetic body in a coil axis direction and an inter-coil distance which is a distance between the feeding coil and receiving coil is equal to or less than 0.125.

According to the present invention, in wireless power feeding of a magnetic field resonance type, power transmission efficiency can be easily adjusted in accordance with a device configuration or a device installation status.

BRIEF DESCRIPTION OF THE DRAWINGS

The above features and advantages of the present invention will be more apparent from the following description of certain preferred embodiments taken in conjunction with the accompanying drawings, in which:

FIG. 6 is a data table (Lm/DL=0.125) showing a relationship among an inter-coil distance, a magnetic body length, a magnetic body radius, and an offset;

FIG. 7 is a data table (Lm/DL=0.250) showing the relationship among the inter-coil distance, magnetic body length, magnetic body radius, and offset;

FIG. 8 is a data table (Lm/DL=0.500) showing the relationship among the inter-coil distance, magnetic body length, magnetic body radius, and offset;

FIG. 9 is a data table (Lm/DL=0.750) showing the relationship among the inter-coil distance, magnetic body length, magnetic body radius, and offset;

FIG. 10 is a data table (Lm/DL=1.000) showing the relationship among the inter-coil distance, magnetic body length, magnetic body radius, and offset;

DETAILED DESCRIPTION OF THE EMBODIMENTS

A preferred embodiment of the present invention will be described below with reference to the accompanying drawings.

First Embodiment

Figure 1:
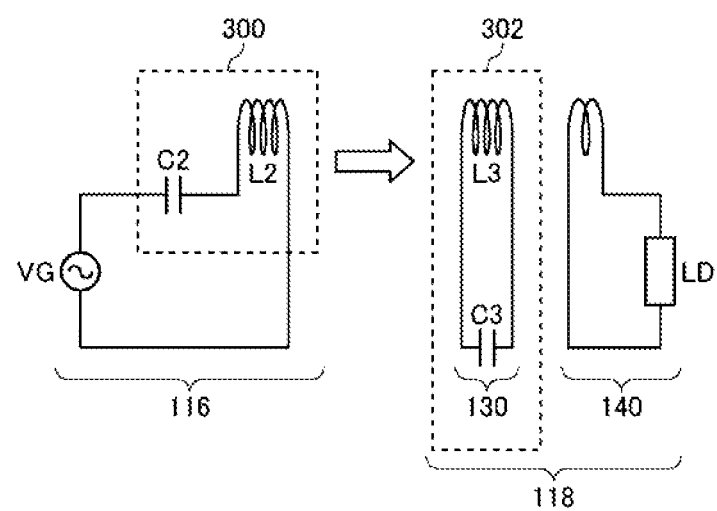
FIG. 1 is a view illustrating operation principle of a wireless power transmission system according to a first embodiment.

FIG. 1 is a view illustrating operation principle of a wireless power transmission system 100 according to first embodiment. The wireless power transmission systems 100 according to the first embodiment each include a wireless power feeder 116 and a wireless power receiver 118. The wireless power feeder 116 includes a power feeding LC resonance circuit 300. The wireless power receiver 118 includes a receiving coil circuit 130 and a loading circuit 140. A power receiving LC resonance circuit 302 is formed by the receiving coil circuit 130.

The power feeding LC resonance circuit 300 includes a capacitor C2 and a feeding coil L2. The power receiving LC resonance circuit 302 includes a capacitor C3 and a receiving coil L3. The values of the capacitor C2, feeding coil L2, capacitor C3, and receiving coil L3 are set such that the resonance frequencies of the feeding LC resonance circuit 300 and receiving LC resonance circuit 302 coincide with each other in a state where the feeding coil L2 and receiving coil L3 are disposed away from each other far enough to ignore the magnetic field coupling therebetween. This common resonance frequency is assumed to be fr0.

In a state where the feeding coil L2 and receiving coil L3 are brought close to each other in such a degree that they can be magnetic-field-coupled to each other, a new resonance circuit is formed by the power feeding LC resonance circuit 300, power receiving LC resonance circuit 302, and mutual inductance generated between them. The new resonance circuit has two resonance frequencies fr1 and fr2 (fr1<fr0<fr2) due to the influence of the mutual inductance. When the wireless power feeder 116 supplies AC power from a power feeding source VG to the power feeding LC resonance circuit 300 at the resonance frequency fr1, the power feeding LC resonance circuit 300 constituting a part of the new resonance circuit resonates at a resonance point 1 (resonance frequency fr1). When the power feeding LC resonance circuit 300 resonates, the feeding coil L2 generates an AC magnetic field of the resonance frequency fr1. The power receiving LC resonance circuit 302 constituting a part of the new resonance circuit also resonates by receiving the AC magnetic field. When the power feeding LC resonance circuit 300 and power receiving LC resonance circuit 302 resonate at the same resonance frequency fr1, wireless power feeding from the feeding coil L2 to receiving coil L3 is performed with the maximum power transmission efficiency. Received power is taken from a load LD of the wireless power receiver 118 as output power. Note that the new resonance circuit can resonate not only at the resonance point 1 (resonance frequency fr1) but also at a resonance point 2 (resonance frequency fr2).

Although FIG. 1 illustrates a configuration in which the wireless power feeder 116 does not include an exciting coil, the basic operation principle is the same as in the case where the wireless power feeder 116 includes the exciting coil.

Figure 2:
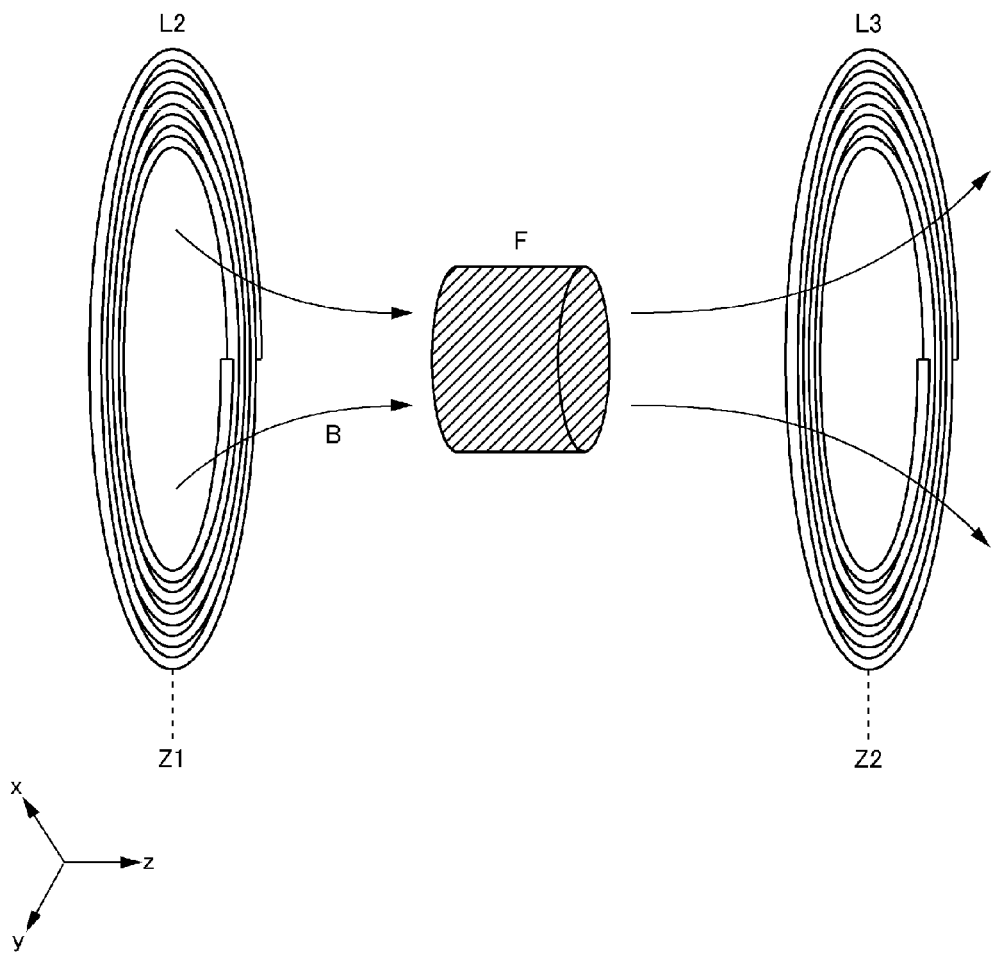
FIG. 2 is a perspective view illustrating a state where a magnetic body is disposed between a feeding coil and a receiving coil.

FIG. 2 is a perspective view illustrating a state where a magnetic body F is disposed between the feeding coil L2 and receiving coil L3. A z-axis is set in a right direction, i.e., in a power feeding direction. The same applies in the following figures. The feeding coil L2 and receiving coil L3 in the present embodiment are each a circular coil. Although ferrite is used as a material of the magnetic body F, other magnetic materials may be used. The magnetic body F has a columnar shape. A magnetic flux B generated from the feeding coil L2 is collected by the magnetic body F. This allows the magnetic flux B generated from the feeding coil L2 to easily penetrate through the receiving coil L3.

Assuming that a z-coordinate of a coil surface of the feeding coil L2 is z1 and z-coordinate of a coil surface of the receiving coil L3 is z2, the magnetic body F exists between the z1 and z2. Thus, the magnetic body F is disposed at a position at which it does not overlap the coil surfaces of both the feeding and receiving coils L2 and L3, in other words, disposed in a space between the coil surfaces of both the feeding and receiving coils L2 and L3. Central axes of the feeding coil L2, receiving coil L3, and magnetic body F preferably coincide with one another, but not essential.

Figure 3:
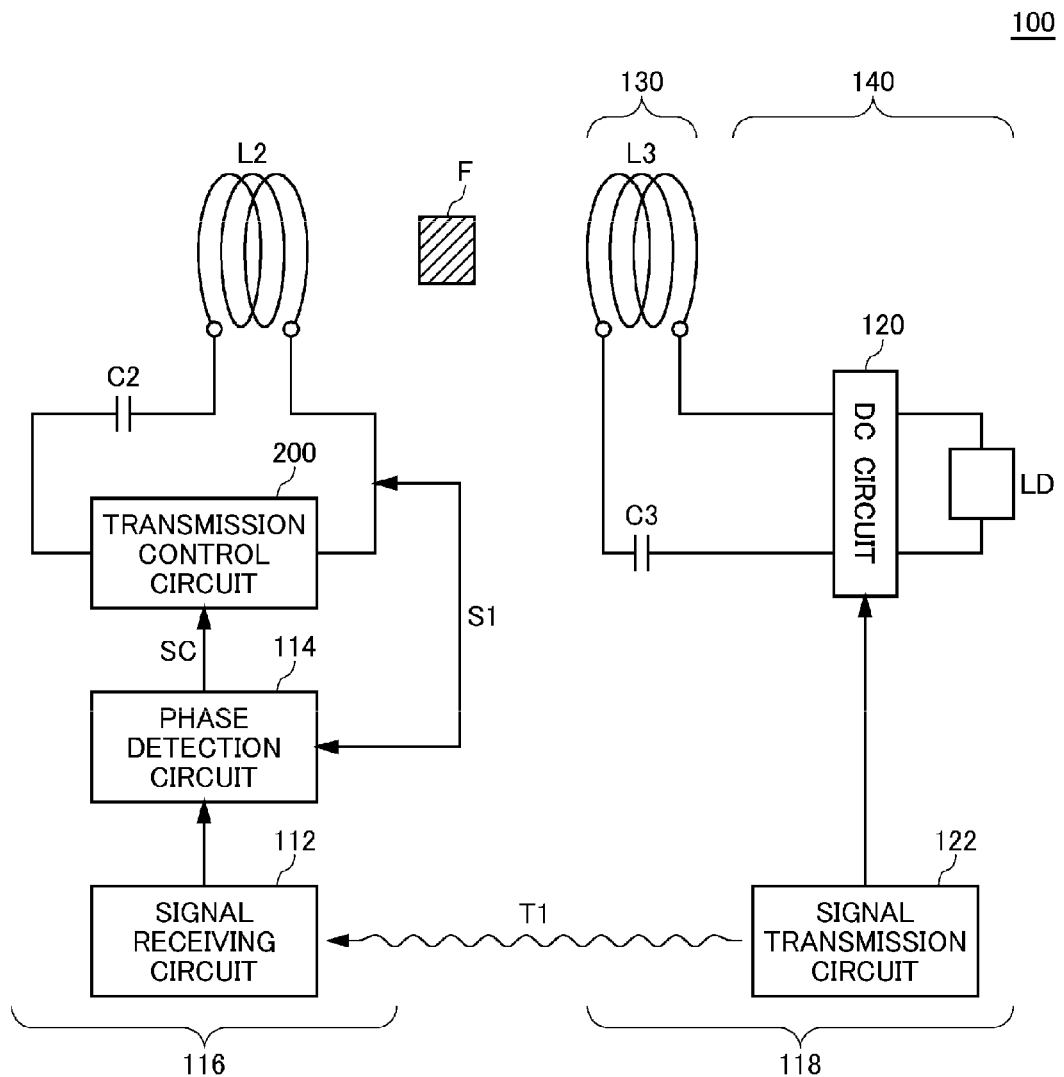
FIG. 3 is a system configuration view (first example) of the wireless power transmission system according to the first embodiment.

FIG. 3 is a system configuration view (first example) of the wireless power transmission system 100 according to the first embodiment. The wireless power feeder 116 includes, as basic components, the feeding coil L2, capacitor C2, a transmission control circuit 200, a phase detection circuit 114, and a signal receiving circuit 112. The wireless power receiver 118 includes the receiving coil circuit 130, loading circuit 140, and a signal transmission circuit 122. The loading circuit 140 makes the DC circuit 120 convert received electric power into DC current, and supplies the DC current to the load LD. The loading circuit 140 may have an impedance adjustment circuit for achieving impedance matching between the power receiving LC resonance circuit 302 and the load LD.

In the first example illustrated in FIG. 3, the load LD and the DC circuit 120 (loading circuit 140) are directly connected to the receiving coil circuit 130 without intervention of a loading coil L4. As a matter of course, the loading circuit 140 may receive power in a non-contact manner from the receiving coil circuit 130 through the loading coil L4 as a second example shown in FIG. 21.

The wireless power transmission system 100 mainly aims to feed AC power from the feeding coil L2 to receiving coil L3 by wireless. In the first embodiment, a resonance frequency fr1 is set to 1 MHz. The feeding coil L2 receives AC power from the transmission control circuit 200 (power feeding source VG) at a drive frequency fo.

The receiving coil circuit 130 is a circuit in which the receiving coil L3 and capacitor C3 are connected in series. The feeding coil L2 and receiving coil L3 face each other. The feeding coil L2 and receiving coil L3 need not have the same shape. When the feeding coil L2 generates a magnetic flux at the resonance frequency fr1 (=1 MHz), the feeding coil L2 and receiving coil L3 magnetically resonate, causing large current to flow in the receiving coil circuit 130. The magnetic body F disposed between the feeding coil L2 and receiving coil L3 increases a magnetic flux density of the receiving coil L3.

In the loading circuit 140 of the first example, the load LD is directly connected to the receiving coil circuit 130 through the DC circuit 120. AC current flows in the receiving coil L3, and whereby the AC current flows also in the loading circuit 140. This AC current is rectified into DC current by the DC circuit 120 and supplied to the load LD.

The signal transmission circuit 122 has a voltage measuring function and measures voltage (output voltage) to be applied to the load LD. Further, the signal transmission circuit 122 amplifies a difference (hereinafter, referred to as "correction voltage") between a predetermined reference potential and the output voltage and outputs the amplified value in the form of a light signal T1. The T1 signal represents a magnitude of the correction voltage. In other words, the T1 signal represents a change in the output voltage. In the wireless power transmission system 100, feeding power is controlled such that the correction voltage becomes zero so as to stabilize the output voltage. The T1 signal is received by the T1 receiving circuit 112 of the wireless power feeder 116. The T1 signal allows the power feeding side to recognize the magnitude of the correction voltage.

Although a light signal is used as the signal to be output from the signal transmission circuit 122 in the present embodiment, the present invention is not limited to this, but signals of various frequency bands, such as an electromagnetic wave signal and an infrared-ray signal can be used.

The transmission control circuit 200 functions as an oscillator that generates AC voltage V0 of the drive frequency fo. The transmission control circuit 200 dynamically changes the drive frequency fo based on an SC signal output from the phase detection circuit 114 and the T1 signal. Although details will be described later, the SC signal represents a magnitude of a deviation between a current phase and a voltage phase, i.e., a magnitude of a deviation between the drive frequency fo and resonance frequency fr1, and the T1 signal represents a magnitude of a deviation between the output voltage and reference potential.

The resonance frequency fr1 slightly changes depending on use condition or use environment of the wireless power transmission system 100. Further, in a case where the feeding coil L2 or receiving coil L3 is replaced with new one, the resonance frequency fr1 changes. Alternatively, there may be a case where the resonance frequency fr1 needs to be changed aggressively by making electrostatic capacitance of the capacitor C2 or C3 variable. Further, when the feeding coil L2 and receiving coil L3 are brought close to each other to some extent, the resonance frequency fr1 is reduced. When the difference between the resonance frequency fr1 and drive frequency fo changes, the power transmission efficiency changes. When the power transmission efficiency changes, the output voltage changes accordingly. Thus, in order to stabilize the output voltage, it is necessary to keep constant the difference between the resonance frequency fr1 and drive frequency fo even when the resonance frequency fr1 changes. The wireless power transmission system 100 has a drive frequency tracking function of making the drive frequency fo automatically track a change in the resonance frequency fr1.

The phase detection circuit 114 detects a deviation (phase difference) between the current phase and voltage phase and generates the SC signal representing the magnitude of the phase difference. Detecting the phase difference allows detection of the magnitude of the deviation between the resonance frequency fr1 and drive frequency fo. It is possible to keep the phase difference between the drive frequency fo and resonance frequency fr constant by controlling the drive frequency fo according to the SC signal.

For example, when the drive frequency fo and resonance frequency fr1 deviate from each other, the phase difference is accordingly increased, so that the phase detection circuit 114 generates the SC signal so as to reduce the phase difference. Thus, even if the resonance frequency fr1 changes, it is possible to keep the power transmission efficiency constant to thereby stabilize the output voltage.

Further, the output voltage may change even if the resonance frequency fr1 is kept constant. For example, in a case where the load LD is a variable resistor or in a case where the load LD is replaced with new one, the output voltage changes. In the present embodiment, not only the phase difference between the current phase and voltage phase in the feeding coil L2, but also a change in the output voltage is detected as the correction voltage, and the drive frequency fo is automatically adjusted so as to make the correction voltage be zero, whereby the output voltage is stabilized.

The correction voltage is transmitted from the signal transmission circuit 122 to signal receiving circuit 112 as the T1 signal (AC light signal). The phase detection circuit 114 corrects an S1 signal representing a current phase by using the T1 signal representing the correction voltage. When the T1 signal is zero, that is, when the output voltage assumes a desired value, the S1 signal is not corrected. The phase detection circuit 114 outputs the SC signal based on the phase difference between the voltage phase of AC power and an actual current phase (S1 signal). The transmission control circuit 200 adjusts the drive frequency fo based on the SC signal. By such a method, the output from the feeding coil L2 is stabilized even if the resonance frequency changes.

When the output voltage changes, the phase detection circuit 114 corrects the S1 signal representing the current phase based on the T1 signal and outputs a comparison result between the corrected S1 signal and voltage phase as the SC signal. The S1 signal at this time does not represent the actual current phase. A more detailed control method is described in U.S. Patent Application Publication No. 2011-0127846.

Figure 4:
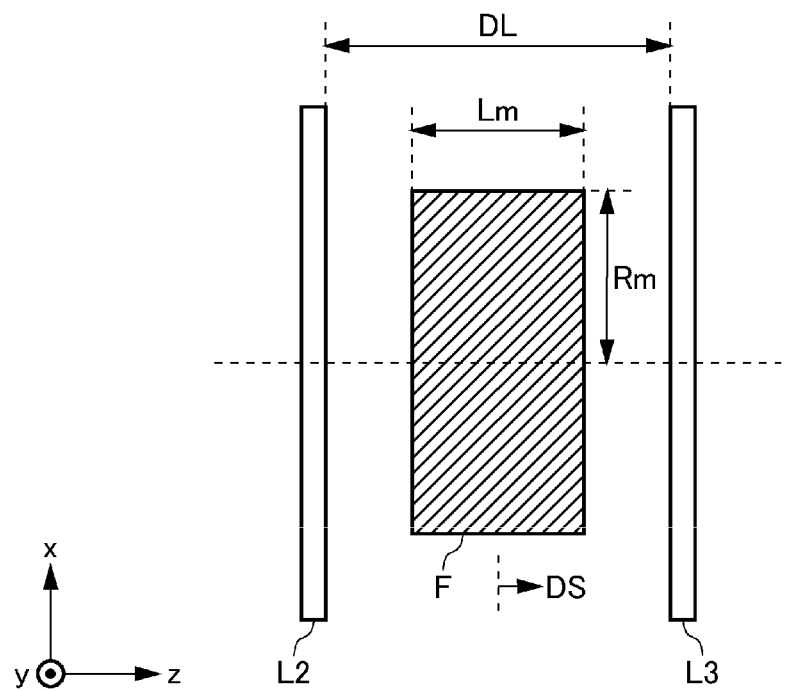
FIG. 4 is a side view of the feeding coil, receiving coil, and magnetic body.

FIG. 4 is a side view of the feeding coil L2, receiving coil L3, and magnetic body F. The inter-coil distance between the feeding coil L2 and receiving coil L3 is assumed to be DL, a z-direction length (magnetic body length) of the columnar magnetic body F is assumed to be Lm, and a radius of the magnetic body F is assumed to be Rm. The magnetic body F is movable in the z-axis direction. When the magnetic body F is situated in the mid point between the feeding coil L2 and receiving coil L3, an offset DS is zero. When the magnetic body F comes close to the receiving coil L3 (moves in a positive z-axis direction), the offset DS becomes larger than zero; while when the magnetic body F comes close to the feeding coil L2 (moves in a negative z-axis direction), the offset DS becomes smaller than zero.

In the present embodiment, the inter-coil distance DL is 40 mm, and the feeding coil L2 and receiving coil L3 are each formed of copper; however, the feeding coil L2 and receiving coil L3 may be formed of an alloy of Cu and another metal or aluminum.

Figure 5:
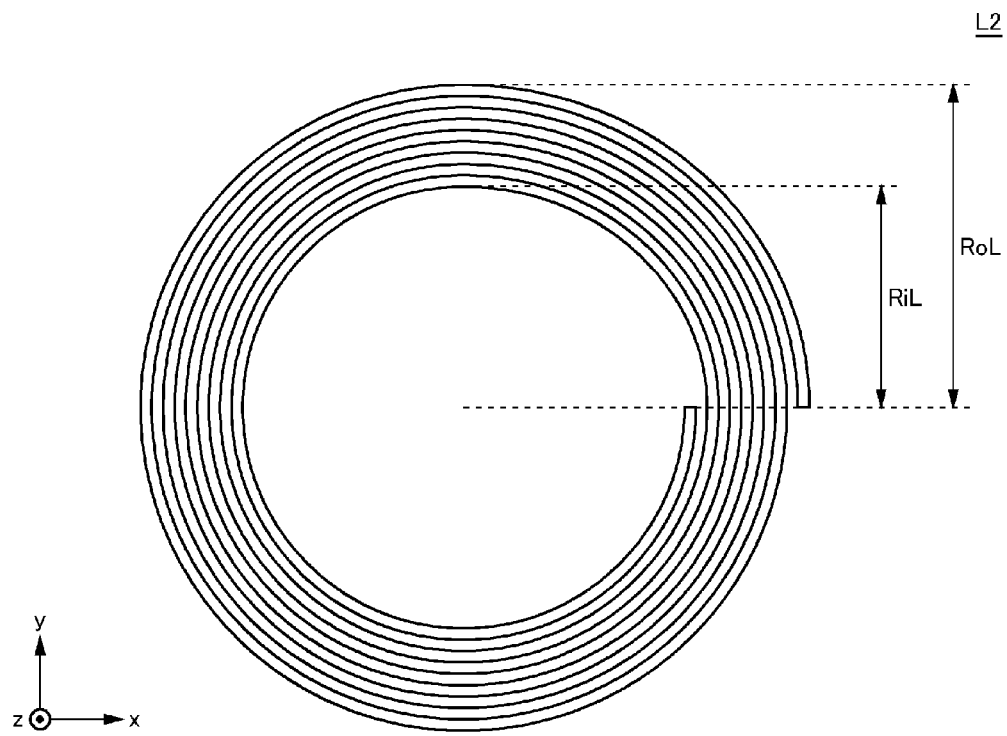
FIG. 5 is a front view of the feeding coil.

FIG. 5 is a front view of the feeding coil L2. The feeding coil L2 is a disk-shaped coil having an inner diameter RiL and an outer diameter RoL, and the number of coil turns thereof is five. The receiving coil L3 has the same configuration as that of the feeding coil L2. In the present embodiment, the RiL and RoL are set to 20 mm and 30 mm, respectively, for both the feeding coil L2 and receiving coil L3.

FIGS. 6 to 10 are each a data table showing a relationship among the inter-coil distance DL, magnetic body length Lm, magnetic body radius Rm, and offset DS. Here, a ratio between an area (magnetic body area) of a surface (circular shape) of the magnetic body F that is opposed to the feeding coil L2 or receiving coil L3 and an area (coil area) of a coil surface (circular shape) of the feeding coil L2 or receiving coil L3 is referred to as "first ratio". The first ratio is calculated as a square of Rm/RoL (radius ratio). Further, Lm/DL which is a ratio between the magnetic body length Lm and inter-coil distance DL is referred to as "second ratio". FIGS. 6 to 10 each show a relationship among the offset ratio (DS/DL), Rm, radius ratio, first ratio (area ratio), second ratio, and power transmission efficiency. The power transmission efficiency in the absence of the magnetic body F is 88%. Shaded portions in the data table each represent a setting (setting in which the power transmission efficiency becomes less than 88%) in which improvement of the power transmission efficiency cannot be expected in the presence of the magnetic body F.

First, a case where the offset DS is 0, that is, DS/DL is 0 will be described. As is clear from FIG. 6, when the first ratio is equal to or less than 0.810, the power transmission efficiency is improved regardless of the Rm. The same can be said for FIGS. 7 to 10. Thus, at least when the first ratio (area ratio between the magnetic body F and feeding coil L2 or the like) is set to equal to or less than 0.810, the power transmission efficiency can be improved by the presence of the magnetic body F. Conversely, when an outer diameter of the magnetic body F is too large relative to the RoL, the power transmission efficiency is degraded.

In FIG. 6 (Lm/DL=0.125), the power transmission efficiency becomes maximum (89.7%) when the first ratio is 0.444. In FIG. 7 (Lm/DL=0.250) and FIG. 8 (Lm/DL=0.500), the power transmission efficiency becomes maximum when the first ratio is 0.444, and in FIG. 9 (Lm/DL=0.750) and FIG. 10 (Lm/DL=1.000), the power transmission efficiency becomes maximum when the first ratio is 0.111. Thus, it can be said that at least when the first ratio is equal to or less than 0.444, the power transmission efficiency can be improved significantly.

Further, at least when the first ratio is equal to or less than 0.028 regardless of the offset ratio (DS/DL), the power transmission efficiency can be improved. In other words, setting the first ratio to equal to or less than 0.028 makes it possible to prevent the power transmission efficiency from being excessively reduced due to a positional change of the magnetic body F.

When the second ratio is equal to or less than 0.125, the power transmission efficiency is improved at least when the first ratio is equal to or less than 0.111. That is, even a small magnetic body F having the second ratio (length ratio) of equal to or less than 0.125 and first ratio (area ratio) of equal to or less than 0.111 can reliably improve the power transmission efficiency.

When a range of the positional change of the magnetic body F can be restricted such that the offset ratio is equal to or less than 0.125, the power transmission efficiency can be improved when the first ratio is equal to or less than 0.694, regardless of the second ratio.

Figure 11:
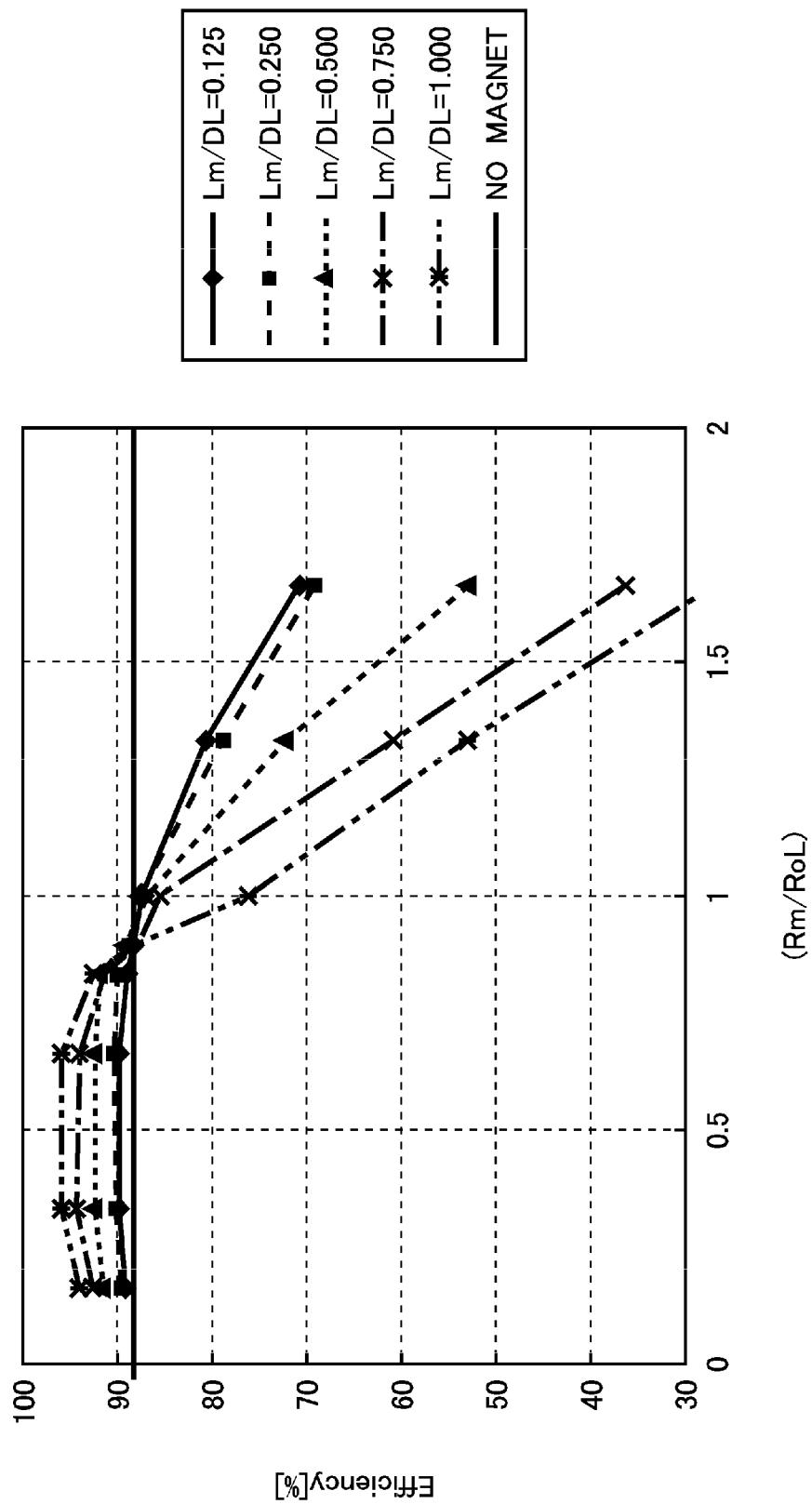
FIG. 11 is a first graph showing a relationship among a first ratio, a second ratio, and power transmission efficiency.

FIG. 11 is a first graph showing a relationship among the first ratio, second ratio, and power transmission efficiency. FIG. 11 is created based on the data tables of FIGS. 6 to 10. Here, the offset ratio is set to 0. The power transmission efficiency in the absence of the magnetic body F is 88%. As is clear from FIG. 11, the power transmission efficiency is improved when the Rm/RoL is equal to or less than about 0.90 (first ratio is equal to or less than 0.810) regardless of the second ratio (Lm/DL).

Figure 12:
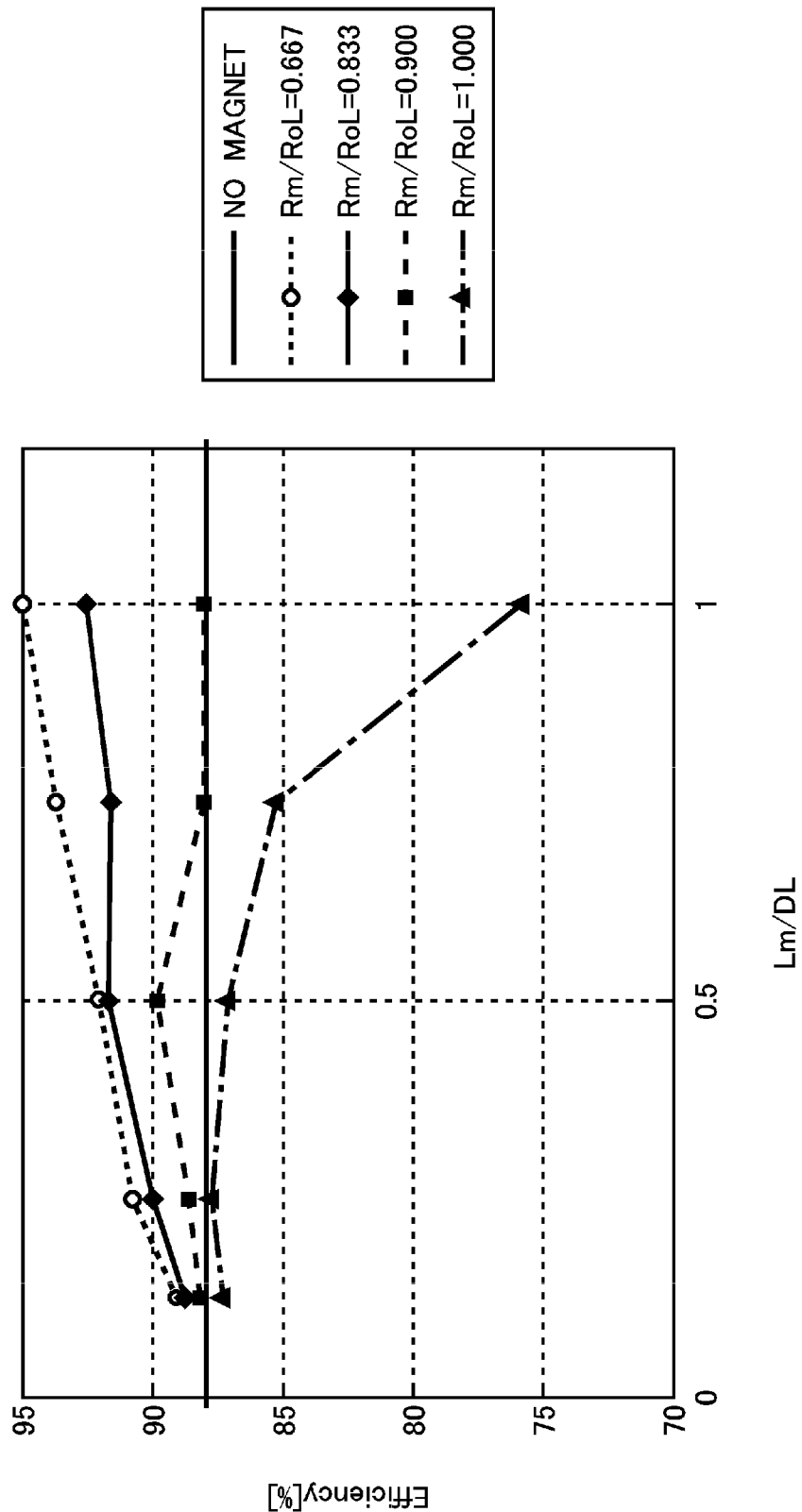
FIG. 12 is a second graph showing the relationship among the first ratio, second ratio, and power transmission efficiency.

FIG. 12 is a second graph showing a relationship among the first ratio, second ratio, and power transmission efficiency. It can be confirmed that at least when the first ratio (area ratio) is equal to or less than 0.810, the smaller the Rm/RoL, the larger the improvement of the power transmission efficiency due to presence of the magnetic body F.

Figure 13:
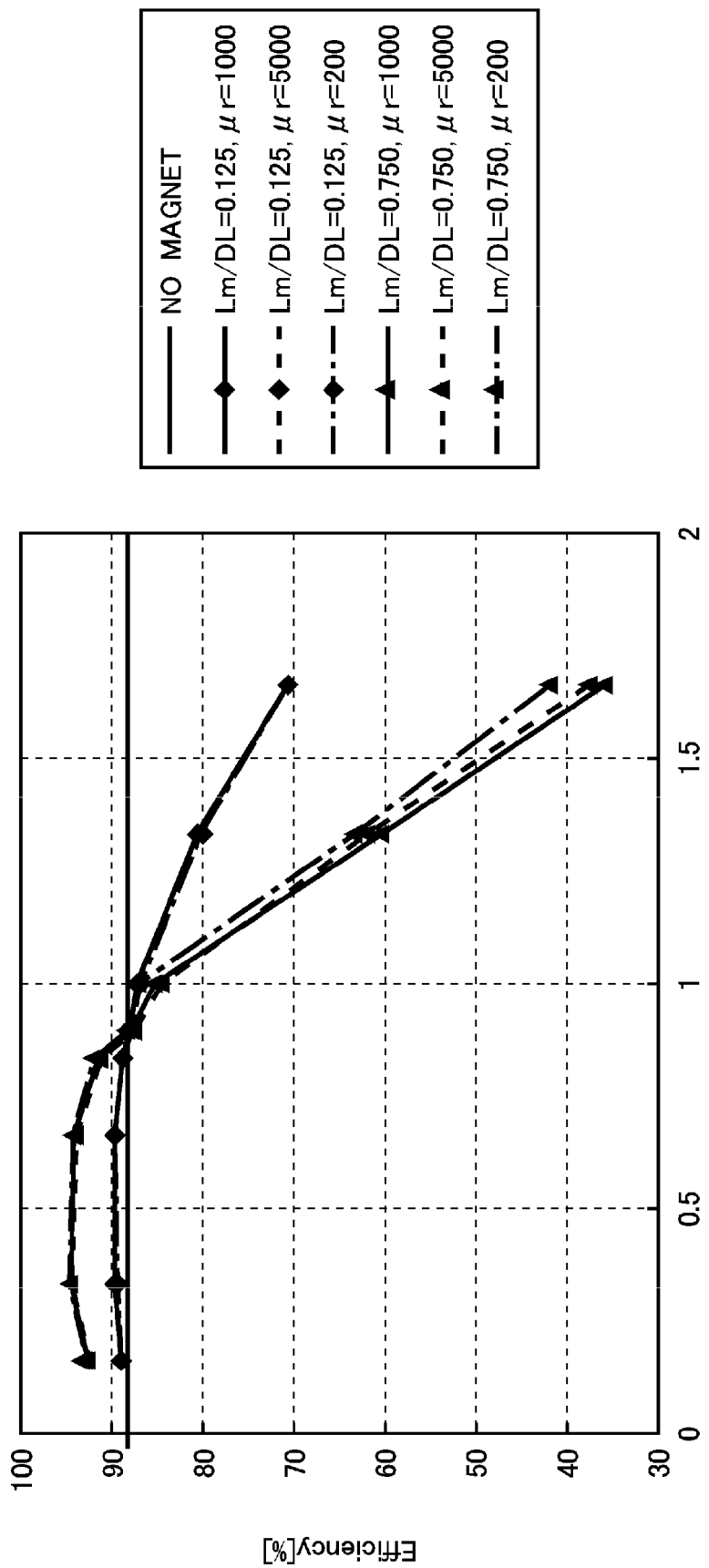
FIG. 13 is a graph showing a relationship among the first ratio, the second ratio, a relative magnetic permeability, and the power transmission efficiency.

FIG. 13 is a graph showing a relationship among the first ratio, the second ratio, a relative magnetic permeability, and the power transmission efficiency. Although a relative magnetic permeability μr is changed from 200 to 5000, a notable change in the power transmission efficiency due to the difference in the relative magnetic permeability is not seen. That is, it has been found that the first ratio or second ratio contributes more to the power transmission efficiency than the relative magnetic permeability.

Figure 14:
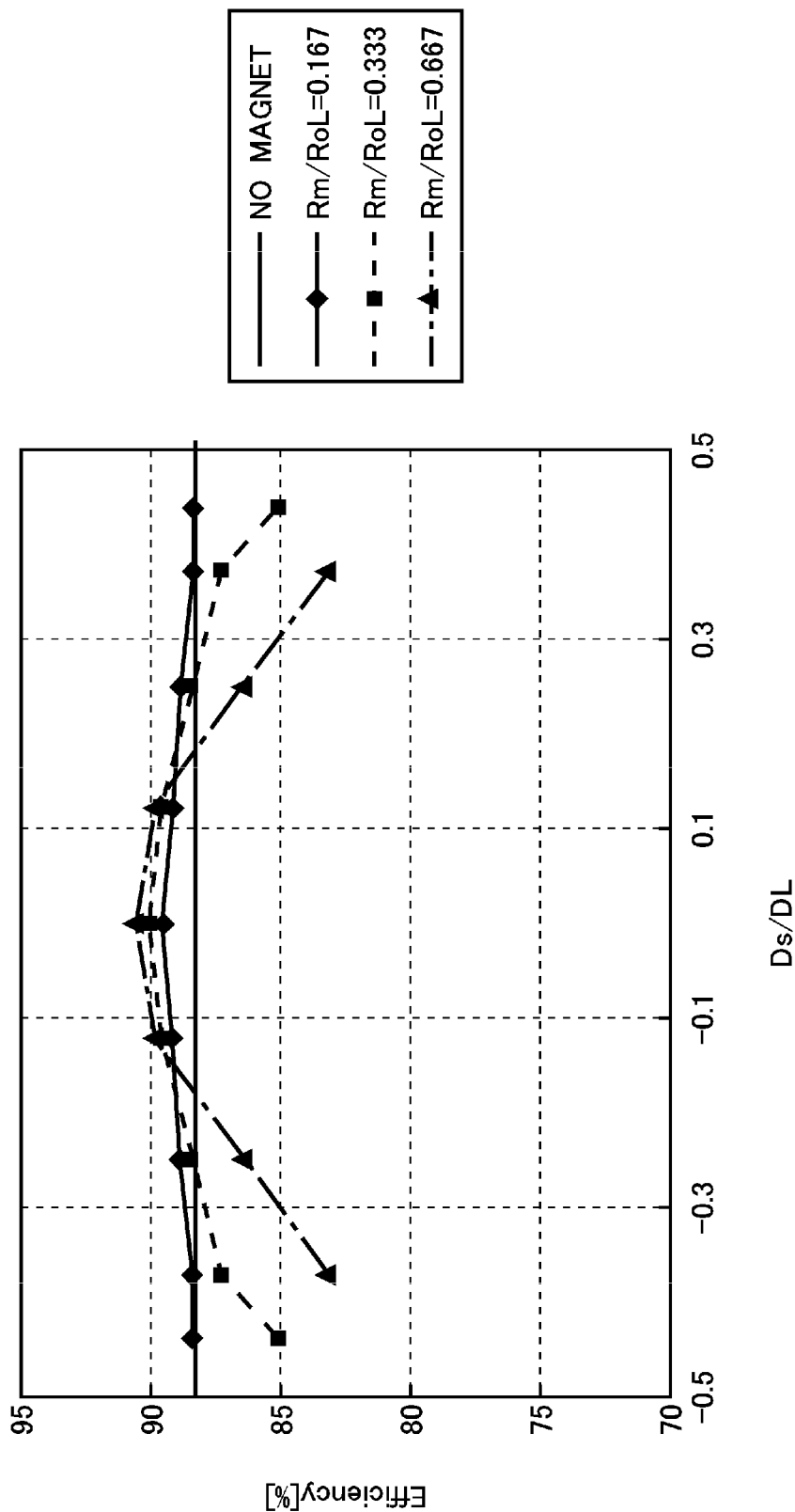
FIG. 14 is a graph showing a relationship among an offset ratio, the first ratio, and the power transmission efficiency.

FIG. 14 is a graph showing a relationship among the offset ratio, first ratio, and power transmission efficiency. When the Rom/RoL is equal to or less than 0.167 (when the first ratio is equal to or less than 0.028), the power transmission efficiency is improved regardless of the offset ratio.

Figure 15:
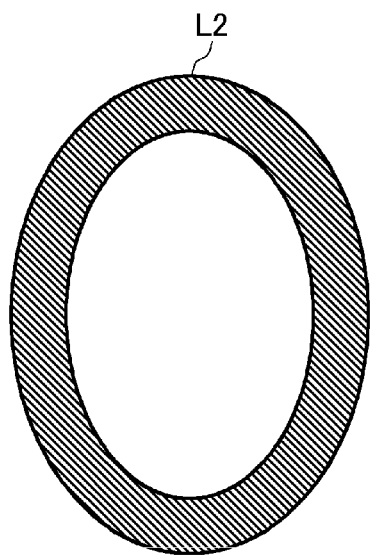
FIG. 15 is a view illustrating an outer appearance of an ellipsoidal coil.
Figure 16:
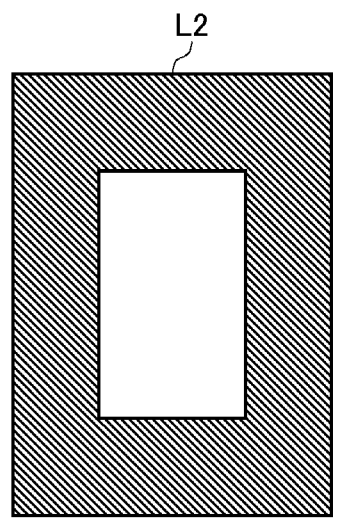
FIG. 16 is a view illustrating an outer appearance of a rectangular coil.

Although the feeding coil L2 and receiving coil L3 each have a true circular shape in the present embodiment, they may have an ellipsoidal shape illustrated in FIG. 15 or a rectangular shape illustrated in FIG. 16. The feeding coil L2 and receiving coil L3 may each have an arbitrary shape.

Figure 17:
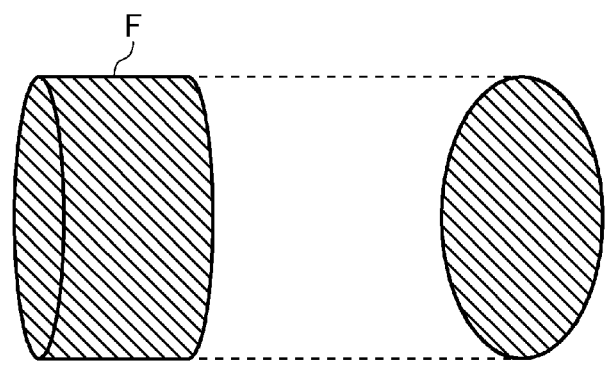
FIG. 17 is a view illustrating an outer appearance of an ellipsoidal magnetic body.
Figure 18:
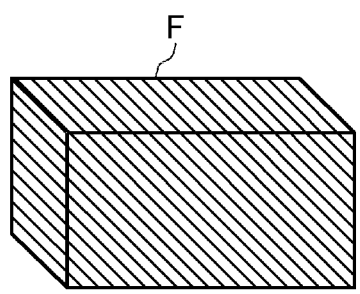
FIG. 18 is a view illustrating an outer appearance of a rectangular parallelepiped magnetic body.

Further, although the magnetic body F has a columnar shape in the present embodiment, a cross section thereof may be an ellipsoid as illustrated in FIG. 17, not a true circle. Further, the magnetic body F may have a rectangular parallelepiped shape as illustrated in FIG. 18. That is, the magnetic body F may have an arbitrary shape.

Figure 19:
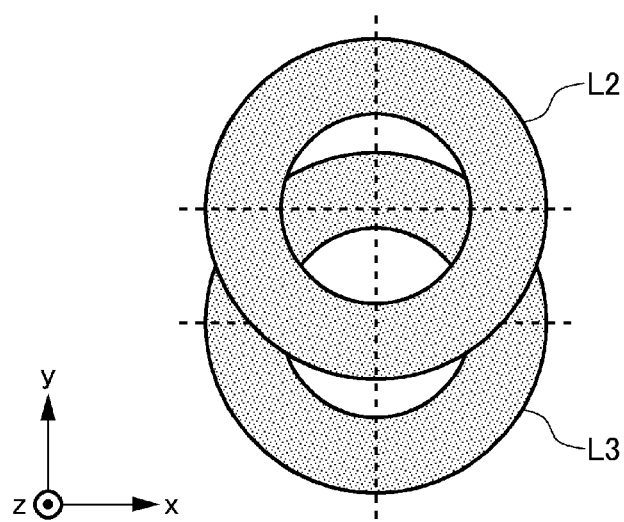
FIG. 19 is an outer appearance view of the feeding coil and receiving coil in a state where they are displaced relative to each other.

Although central axes of the feeding coil L2 and receiving coil L3 preferably coincide with each other, they may be displaced relative to each other as illustrated in FIG. 19.

Figure 20:
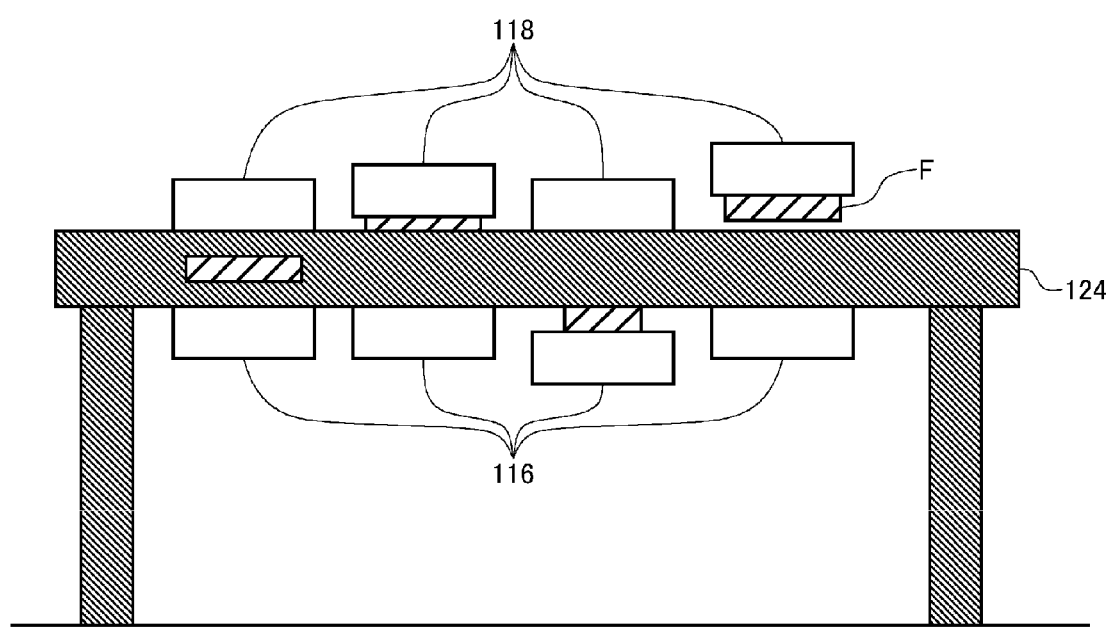
FIG. 20 is a view illustrating a method of wireless power feeding across a table.

FIG. 20 is a view illustrating an application example of the wireless power transmission system 100 according to the present embodiment. The wireless power receiver 118 may be configured as a power receiving body of a laptop PC or an illumination device. The wireless power feeder 116 is installed on a table 124 and whereby power can be fed by wireless to the wireless power receiver 118 placed on the table 124. In this case, the magnetic body F may be installed on an upper surface or lower surface of the table 124 or may be embedded inside the table 124. Further alternatively, the magnetic body F may be incorporated in the wireless power feeder 116 or wireless power receiver 118 as a part thereof. When the magnetic body F is attached to the upper surface or lower surface of the table 124, replacement of the magnetic body F can be easily made.

The wireless power feeding according to the present embodiment achieved using the magnetic body F may be applicable to a case where power is fed across a wall or a roof of a building. Furthermore, the wireless power feeding according to the present embodiment may be applied to a case where power is fed by wireless from the wireless power feeder 116 provided in the ground to the wireless power receiver 118 provided in a vehicle.

Figure 21:
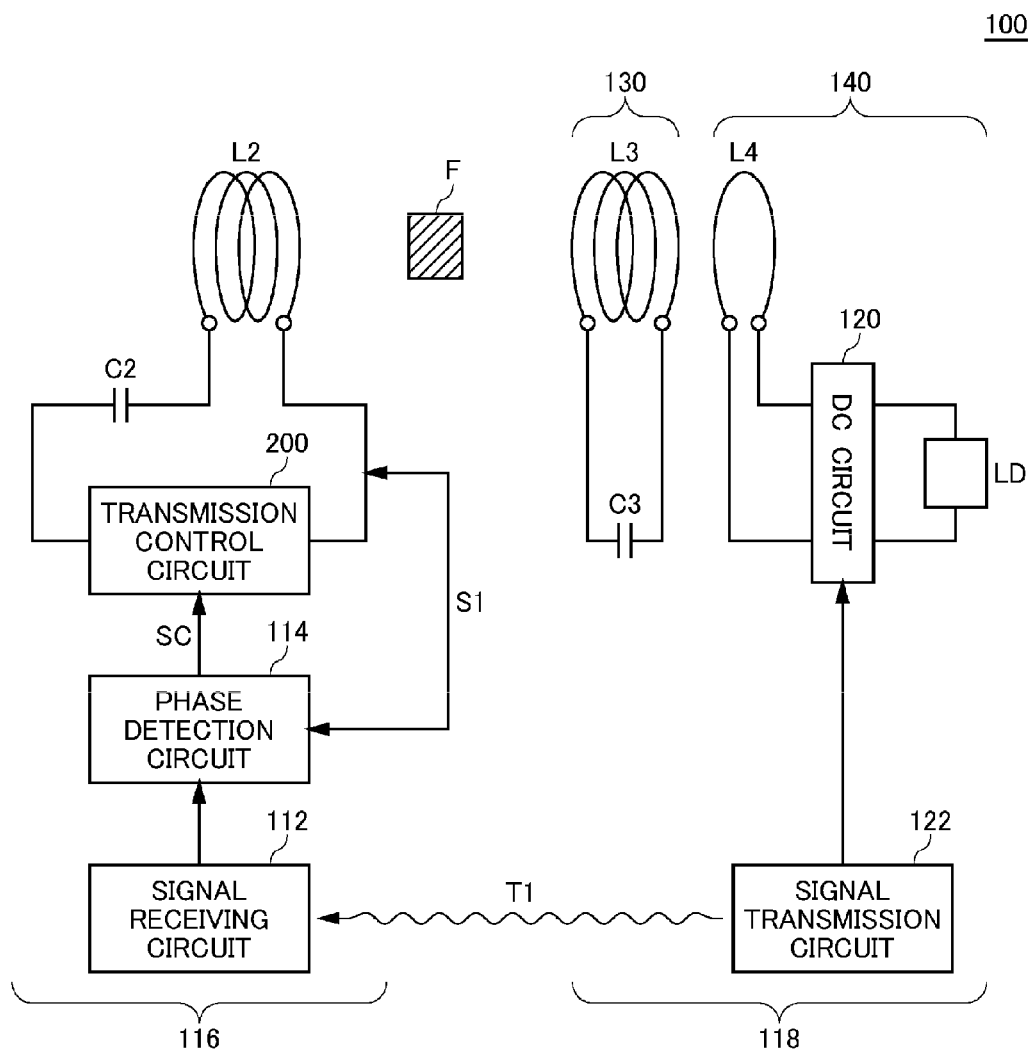
FIG. 21 is a system configuration view (second example) of the wireless power transmission system according to the first embodiment.

FIG. 21 is a system configuration view (second example) of the wireless power transmission system according to the first embodiment. As illustrated in FIG. 21, the receiving coil circuit 130 is separated from the loading circuit 140, and the loading circuit 140 may receive power from the receiving coil circuit 130 by the loading coil L4 that electromagnetically couples with the receiving coil L3.

Second Embodiment

Figure 22:
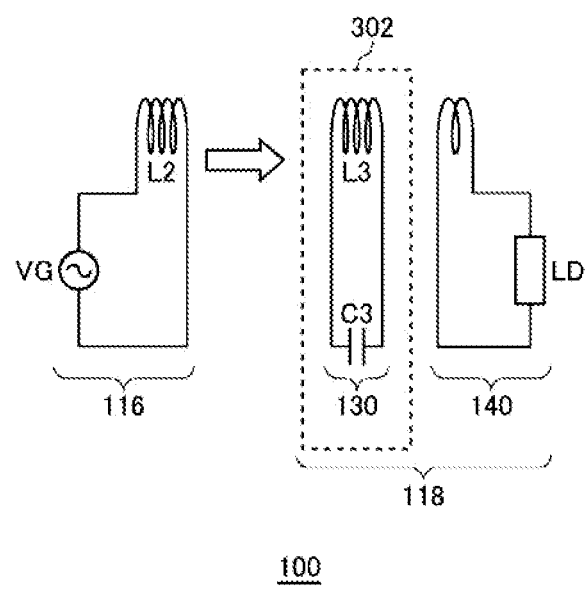
FIG. 22 is a view illustrating operation principle of a wireless power transmission system according to a second embodiment.

FIG. 22 is a view illustrating operation principle of the wireless power transmission system 100 according to a second embodiment. The wireless power transmission system 100 of the second embodiment also includes the wireless power feeder 116 and wireless power receiver 118. However, the wireless power receiver 118 includes the power receiving LC resonance circuit 302, while the wireless power feeder 116 does not include the power feeding LC resonance circuit 300. That is, the feeding coil L2 does not constitute a part of the LC resonance circuit. More specifically, the feeding coil L2 does not form any resonance circuit with other circuit elements included in the wireless power feeder 116. No capacitor is connected in series or in parallel to the feeding coil L2. Thus, the feeding coil L2 does not resonate in a frequency at which power transmission is performed.

The power feeding source VG supplies AC current of the resonance frequency fr1 to the feeding coil L2. The feeding coil L2 does not resonate but generates an AC magnetic field of the resonance frequency fr1. The power receiving LC resonance circuit 302 resonates by receiving the AC magnetic field. As a result, high AC current flows in the power receiving LC resonance circuit 302. Studies have revealed that formation of the LC resonance circuit is not essential in the wireless power feeder 116. The feeding coil L2 does not constitute apart of the power feeding LC resonance circuit, so that the wireless power feeder 116 does not resonate at the resonance frequency fr1. It has been generally understood that, in the wireless power feeding of a magnetic field resonance type, making resonance circuits which are formed on the power feeding side and power receiving side resonate at the same resonance frequency fr1 (=fr0) allows power feeding of high power. However, it is found that even in the case where the wireless power feeder 116 does not contain the power feeding LC resonance circuit 300, if the wireless power receiver 118 includes the power receiving LC resonance circuit 302, the wireless power feeding of a magnetic field resonance type can be achieved.

Even when the feeding coil L2 and receiving coil L3 are magnetic-field coupled to each other, a new resonance circuit (new resonance circuit formed by coupling of resonance circuits) is not formed due to absence of the capacitor C2. In this case, the stronger the magnetic field coupling between the feeding coil L2 and receiving coil L3, the greater the influence exerted on the resonance frequency of the power receiving LC resonance circuit 302. By supplying AC current of this resonance frequency, i.e., resonance frequency near fr1 to the feeding coil L2, the wireless power feeding of a magnetic field resonance type can be achieved. In this configuration, the capacitor C2 need not be provided, which is advantageous in terms of size and cost.

The configuration of the wireless power transmission system 100 has been described based on the embodiments. In the wireless power transmission system 100, the disposition of the magnetic body F between the feeding coil L2 and receiving coil L3 allows improvement of the power transmission efficiency. However, the disposition of the magnetic body F does not always improve the power transmission efficiency, but may result in degradation in the power transmission efficiency depending on the position or size of the magnetic body F. In each of the above embodiments, ascertaining a setting range in which improvement of the power transmission efficiency can be expected makes it easier to control the power transmission efficiency using the magnetic body F. For example, the first ratio or second ratio may be changed by preparing a plurality of magnetic bodies F having different outer diameters Rm or magnetic body lengths Lm and selectively making them overlap each other.

The present invention has been described based on the above embodiments. It should be understood by those skilled in the art that the above embodiments are merely exemplary of the invention, various modifications and changes may be made within the scope of the claims of the present invention, and all such variations may be included within the scope of the claims of the present invention. Thus, the descriptions and drawings in this specification should be considered as not restrictive but illustrative.

The "AC power" used in the wireless power transmission system 100 may be transmitted not only as an energy but also as a signal. Even in the case where an analog signal or digital signal is fed by wireless, the wireless power feeding method of the present invention may be used.

Although the "magnetic field resonance type" that utilizes a magnetic field resonance phenomenon has been described in each of the above embodiments, the magnetic field resonance is not essential in the present invention. For example, each of the present embodiments can be applied to the above-described type A (for short distance) that utilizes the electromagnetic induction, wherein the feeding coil and receiving coil are magnetic-field coupled (inductively coupled) as in the "magnetic field resonance type". Further, each of the present embodiments can be applied to an electric field resonance type (see Jpn. Pat. Appln. Laid-Open Publication No. 2012-044857).

Although the wireless power receiver 118 includes the power receiving LC resonance circuit 302 in each of the above embodiments, a configuration in which the wireless power receiver 118 does not include the power receiving LC resonance circuit 302 may be possible. In this case, the receiving coil L3 need not be connected (both in series or parallel) to the capacitor. Further, a configuration in which the wireless power receiver 118 does not include the power receiving LC resonance circuit 302 and, in addition, the wireless power feeder 116 does not include the power feeding LC resonance circuit 300 may be possible.

What is claimed is:
1. A wireless power transmission system for feeding power by wireless from a feeding coil to a receiving coil, comprising:

the feeding coil;
a transmission control circuit that supplies AC power to the feeding coil at a drive frequency so as to make the feeding coil feed the AC power to the receiving coil;
the receiving coil;
a loading circuit that receives power from the receiving coil; and
a magnetic body that is disposed between the feeding coil and receiving coil, the magnetic body being disposed inside a space between coil surfaces of the feeding coil and receiving coil,
wherein the magnetic body is disposed so that a coil axis connecting a central axis of the feeding coil and a central axis of the receiving coil passes through the magnetic body, and
wherein the magnetic body is configured such that, during power transmission from the feeding coil to the receiving coil, the magnetic body does not move.

2. The wireless power transmission system according to claim 1, wherein
the loading circuit includes a loading coil that is magnetically coupled to the receiving coil to receive the AC power from the receiving coil and a load that receives the AC power from the loading coil.

3. The wireless power transmission system according to claim 1, wherein the magnetic body is formed so as to be movable in a coil axis direction.

4. The wireless power transmission system according to claim 1, wherein
a first ratio between a magnetic body area which is an area of a surface of the magnetic body that is opposed to the feeding coil and a coil area which is an area of the coil surface of the feeding coil or receiving coil is equal to or less than 0.81.

5. The wireless power transmission system according to claim 4, wherein
the first ratio is equal to or less than 0.444.

6. The wireless power transmission system according to claim 5, wherein
the first ratio is equal to or less than 0.028.

7. The wireless power transmission system according to claim 4, wherein the first ratio is equal to or less than 0.111 when a second ratio between a magnetic body length which is a length of the magnetic body in a coil axis direction and an inter-coil distance which is a distance between the feeding coil and receiving coil is equal to or less than 0.125.

8. The wireless power transmission system according to claim 1, wherein at least one of the central axis of the feeding coil or the central axis of the receiving coil coincides with a central axis of the magnetic body.

9. The wireless power transmission system according to claim 1, wherein the central axis of the feeding coil and the central axis of the receiving coil coincides with a central axis of the magnetic body.

10. A wireless power transmission system for feeding power by wireless from a feeding coil to a receiving coil, comprising:
the feeding coil;
a transmission control circuit that supplies AC power to the feeding coil at a drive frequency so as to make the feeding coil feed the AC power to the receiving coil;
the receiving coil;
a loading circuit that receives power from the receiving coil;
a magnetic body that is disposed between the feeding coil and receiving coil, the magnetic body being disposed inside a space between coil surfaces of the feeding coil and receiving coil; and
a phase detection circuit that detects a phase difference between a voltage phase and a current phase of the AC power,
wherein the magnetic body is disposed so that a coil axis connecting a central axis of the feeding coil and a central axis of the receiving coil passes through the magnetic body, and
the transmission control circuit adjusts the drive frequency so as to reduce the phase difference to make the drive frequency track the resonance frequency.

11. The wireless power transmission system according to claim 10, further comprising:
a signal transmission circuit that transmits an output signal representing a magnitude of output voltage to be applied to a part of the loading circuit; and
a signal receiving circuit that receives the output signal at the power feeding side, wherein
the transmission control circuit performs ex-post adjustment of the detected value of both or one of the voltage and current phases according to the output signal.

* * * * *